(12) United States Patent
Faibish et al.

(10) Patent No.: US 10,620,863 B2
(45) Date of Patent: Apr. 14, 2020

(54) MANAGING DATA REDUCTION IN STORAGE SYSTEMS USING MACHINE LEARNING

(71) Applicant: EMC IP Holding Company LLC, Hopkinton, MA (US)

(72) Inventors: Sorin Faibish, Newton, MA (US); Rustem Rafikov, Hopkinton, MA (US); Ivan Bassov, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/051,985

(22) Filed: Aug. 1, 2018

(65) Prior Publication Data

US 2020/0042218 A1    Feb. 6, 2020

(51) Int. Cl.
*G06F 3/06* (2006.01)
*G06N 7/00* (2006.01)
*G06N 20/00* (2019.01)

(52) U.S. Cl.
CPC ............ *G06F 3/0641* (2013.01); *G06F 3/067* (2013.01); *G06F 3/0608* (2013.01); *G06N 7/005* (2013.01); *G06N 20/00* (2019.01)

(58) Field of Classification Search
CPC ....... G06F 3/0608; G06F 3/067; G06F 3/0641
USPC ......................................................... 711/171
See application file for complete search history.

(56) References Cited

U.S. PATENT DOCUMENTS

2014/0244604 A1\*  8/2014  Oltean ................ H03M 7/3091
                                                         707/693

\* cited by examiner

*Primary Examiner* — Hua J Song
(74) *Attorney, Agent, or Firm* — Krishnendu Gupta; Lesley Leonessa

(57) ABSTRACT

A method is used in managing data reduction in storage systems using machine learning. A value representing a data reduction assessment for a first data block in a storage system is calculated using a hash of the data block. The value is used to train a machine learning system to assess data reduction associated with a second data block in the storage system without performing the data reduction on the second data block, where assessing data reduction associated with the second data block indicates a probability as to whether the second data block can be reduced.

18 Claims, 5 Drawing Sheets

MANAGING DATA REDUCTION IN STORAGE SYSTEMS USING MACHINE LEARNING

BACKGROUND

Technical Field

This application relates to managing data reduction in storage systems using machine learning.

Description of Related Art

Computer systems may include different resources used by one or more host processors. Resources and host processors in a computer system may be interconnected by one or more communication connections. These resources may include, for example, data storage devices such as those included in the data storage systems manufactured by Dell EMC™. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system Input/Output (I/O) operations in connection with data requests, such as data read and write operations.

Host processor systems may store and retrieve data using a storage device containing a plurality of host interface units, disk drives, and disk interface units. Such storage devices are provided, for example, by Dell EMC™ of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes. The logical disk units may or may not correspond to the actual disk drives. Allowing multiple host systems to access the single storage device unit allows the host systems to share data stored therein.

In connection with data storage, a variety of different technologies may be used. Data may be stored, for example, on different types of disk devices and/or flash memory devices. The data storage environment may define multiple storage tiers in which each tier includes physical devices or drives of varying technologies. The physical devices of a data storage system, such as a data storage array (or "storage array"), may be used to store data for multiple applications.

Data storage systems are arrangements of hardware and software that typically include multiple storage processors coupled to arrays of non-volatile storage devices, such as magnetic disk drives, electronic flash drives, and/or optical drives. The storage processors service I/O operations that arrive from host machines. The received I/O operations specify storage objects that are to be written, read, created, or deleted. The storage processors run software that manages incoming I/O operations and performs various data processing tasks to organize and secure the host data stored on the non-volatile storage devices.

Some data storage systems employ software compression and decompression to improve storage efficiency. For example, software compression involves loading compression instructions into memory and executing the instructions on stored data using one or more processing cores. A result of such software compression is that compressed data requires less storage space than the original, uncompressed data. Conversely, software decompression involves loading decompression instructions into the memory and executing the instructions on the compressed data using one or more of the processing cores, to restore the compressed data to its original, uncompressed form.

Other data storage systems perform compression and decompression in hardware. For example, a data storage system may include specialized hardware for compressing and decompressing data. The specialized hardware may be provided on the storage processor itself, e.g., as a chip, chipset, or sub-assembly, or on a separate circuit board assembly. Unlike software compression, which operates by running executable software instructions on a computer, hardware compression employs one or more ASICs (Application Specific Integrated Circuits), FPGAs (Field Programmable Gate Arrays), RISC (Reduced Instruction Set Computing) processors, and/or other specialized devices in which operations may be hard-coded and performed at high speed.

Data storage systems typically employ data compression and deduplication techniques to store data more efficiently. In a conventional data storage system, a data stream including a plurality of data segments is received, and a data segment identifier (ID) (e.g., hash value) is generated for each received data segment. The data segment ID is compared with other data segment IDs in an ID index (or ID dictionary). The data segment IDs in the ID dictionary correspond to unique (or deduplicated) data segments within a deduplication domain previously stored by the data storage system. If the data segment ID of the received data segment matches one of the data segment IDs in the ID dictionary, then a check is performed to determine whether or not the received data segment is identical to (or a duplicate of) a previously stored data segment that corresponds to the matching data segment ID. If the received data segment is determined to be a duplicate of a previously stored data segment, then metadata about the received data segment is updated to refer to the previously stored data segment and stored by the data storage system, and the received data segment is removed from the data storage system. If the data segment ID of the received data segment does not match any of the data segment IDs in the ID dictionary, then the received data segment is compressed for storage on the data storage system. Such data compression typically involves searching the entire data segment to be compressed (also referred to herein as the "compression domain") to find any data sequences that are repeated within the data segment, and replacing the repeated data sequences with placeholders that are smaller than the data sequences being replaced.

SUMMARY OF THE INVENTION

In accordance with one aspect of the invention is a method is used in managing data reduction in storage systems using machine learning systems. The method calculates a value representing a data reduction assessment for a first data block in a storage system using a hash of the data block. The method uses the value to train a machine learning system to assess data reduction associated with a second data block in the storage system without performing the data reduction on the second data block, where assessing data reduction associated with a second data block indicates a probability as to whether the second data block can be reduced.

In accordance with another aspect of the invention is a system is used in managing data reduction in storage systems using machine learning systems. The system calculates a value representing a data reduction assessment for a first data block in a storage system using a hash of the data block. The system uses the value to train a machine learning system to assess data reduction associated with a second data block in the storage system without performing the data reduction on the second data block, where assessing data reduction associated with a second data block indicates a probability as to whether the second data block can be reduced.

In accordance with another aspect of the invention, a computer program product comprising a computer readable medium is encoded with computer executable program code. The code enables execution across one or more processors for managing data reduction in storage systems using machine learning systems. The code calculates a value representing a data reduction assessment for a first data block in a storage system using a hash of the data block. The code uses the value to train a machine learning system to assess data reduction associated with a second data block in the storage system without performing the data reduction on the second data block, where assessing data reduction associated with a second data block indicates a probability as to whether the second data block can be reduced.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Figure 1:
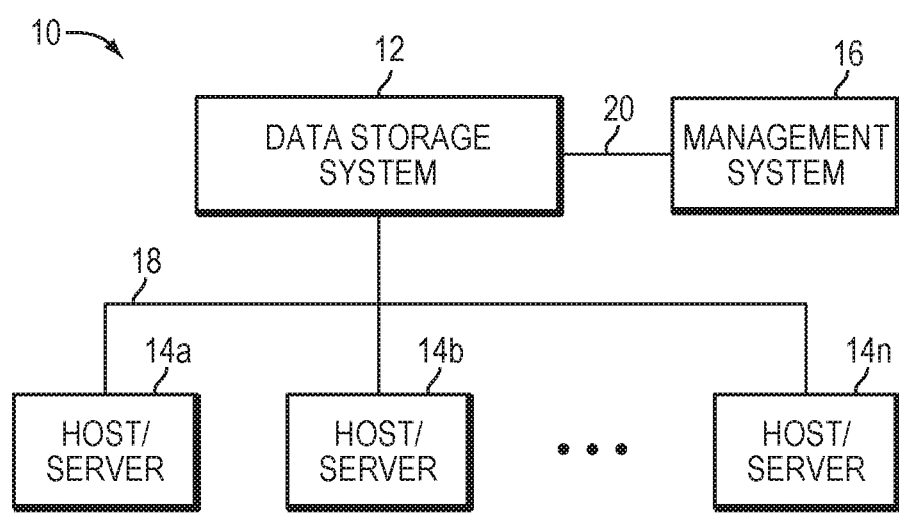
FIG. 1 an example of an embodiment of a computer system, in accordance with an embodiment of the present disclosure.

Described below is a technique for use in managing data reduction in storage systems using machine learning systems, which technique may be used to provide, among other things, calculating a value representing a data reduction assessment for a first data block in a storage system using a hash of the data block, and using the value to train a machine learning system to assess data reduction associated with a second data block in the storage system without performing the data reduction on the second data block, where assessing data reduction associated with a second data block indicates a probability as to whether the second data block can be reduced.

As described herein, in at least one embodiment of the current technique a value is created for a data block. The value represents an assessment of compressibility and/or dedupability. An entropy preserving hash of the data block is calculated. To calculate the value, the hash of the entropy preserving hash of the data block is repeatedly calculated until convergence is achieved. The value (i.e., the entropy value) is used to train a machine learning system to determine whether subsequent data blocks are compressible and/or dedupable, and if compressible, how compressible the data block is, for example, what percentage of the data block is compressible. Hashes are created for the subsequent data blocks, and the hashes are deleted once the machine learning system determines the compressibility/dedupability of the respective subsequent data blocks.

In most of the flash based storage arrays, efficient data reduction is critical to reduce the amount of data written to the flash array using inline compression and deduplication. One of the critical resources for deduplication is the amount of digest memory used to keep the deduplication hash. Since the cache size is a limited resource, some of the deduplication algorithms are designed to allow multiple copies of the same data block on the backend as a compromise to keep the index of the hottest data blocks (i.e., most frequently accessed) in a digest cache. In some storage systems, the deduplication process is only applied to data blocks that are also compressible to a particular threshold percentage. However, until it is determined that the data block is compressible to that particular threshold, the deduplication hash of the data block is maintained in the digest cache. Storage system resources are also used to maintain the data block until it is determined whether the data block is compressible according to the threshold. Once it is determined that a data block is not compressible, the deduplication hash and the data block are maintained in the cache until the data block is written to the backend, taking up resources, and possibly preventing other compressible and/or dedupable data blocks from being cached.

Conventional technologies use data reduction, specifically compression and inline deduplication, to reduce the amount of data written to the flash array. However, the hashes created during the data reduction process consume a large amount of digest memory. Data blocks that are eventually determined to not meet the compressibility threshold also consume storage system resources. Thus, conventional technologies balance space constraints by allowing multiple copies of the same data block on the backend as a compromise to allow space for the hashes of the hottest data blocks (i.e., most frequently accessed) in the digest cache. Both the saved data blocks and the hashes take up valuable cache space.

Conventional technologies may perform deduplication only on data blocks that meet a certain compressibility threshold, for example, data blocks that can be compressed a minimum of 95%. Conventional technologies retain the hash of a data block and the data block in the cache until it is determined whether the data block meets the compressibility threshold. Thus, in such a conventional system, the hash of the data block takes up limited resources even when it is eventually determined that the data block does not meet the compressibility threshold.

By contrast, in at least some implementations in accordance with the current technique as described herein, a machine learning system is trained to manage data reduction in storage systems using machine learning systems. In at least some implementations in accordance with the current technique as described herein, an entropy value is calculated that represents whether a data block is compressible to a particular percentage. The entropy value is used to train the machine learning system to assess whether subsequent data blocks are compressible to a particular percentage and/or dedupable without having to perform the data reduction process. In at least some implementations in accordance with the current technique as described herein, the machine learning determines whether subsequent data blocks are compressible and dedupable using a hash calculated for each respective subsequent data block as input to the machine learning system. The hashes for those subsequent data blocks are removed from the cache once the machine learning system outputs the compressibility/dedupability determination.

Thus, in at least one embodiment of the current technique, the goal of the current technique is to optimize the cache space used. This is accomplished by storing the entropy values which are smaller than the hashes, and deleting the hashes once the values are calculated. In at least one embodiment of the current technique, another goal of the current technique is to quickly determine the compressibility and/or dedupability of data blocks while reducing the central processing unit (CPU) resources used to make those calculations.

In at least some implementations in accordance with the current technique described herein, the use of managing data reduction in storage systems using machine learning systems technique can provide one or more of the following advantages: providing a quick determination regarding compressibility and/or dedupability, avoiding needlessly using the CPU resources to compress data blocks that are ultimately determined to not meet the compressibility threshold, using fewer storage system resources by not using the storage system resources to locate duplicate data blocks, using less cache space by storing entropy values instead of hashes, and deleting hashes once the machine learning system has made a compressibility and/or dedupability determination.

In contrast to conventional technologies, in at least some implementations in accordance with the current technique as described herein, a method calculates a value representing a data reduction assessment for a first data block in a storage system using a hash of the data block. The method uses the value to train a machine learning system to assess data reduction associated with a second data block in the storage system without performing the data reduction on the second data block, where assessing data reduction associated with a second data block indicates a probability as to whether the second data block can be reduced.

In an example embodiment of the current technique, the method avoids storing the second data block in the storage system based on the probability.

In an example embodiment of the current technique, the method trains the machine learning system to assess data reduction associated with the second data block in the storage system based on a respective behavior associated with a plurality of data blocks in the storage system, where the plurality of data blocks comprises the first data block.

In an example embodiment of the current technique, the method provides the machine learning system with the second data block, and a hash associated with the second data block, and in response receives, from the machine learning system, a data reduction assessment for the second data block.

In an example embodiment of the current technique, the data reduction assessment for the second data block is a compressibility associated with the second data block.

In an example embodiment of the current technique, the data reduction assessment for the second data block is a dedupability associated with the second data block.

In an example embodiment of the current technique, the machine learning system identifies at least one other data block previously assessed by the machine learning system that is identical to the second data block.

In an example embodiment of the current technique, when the method calculates the value representing the data reduction assessment for the first data block, the method calculates the hash for the first data block, where a probability as to whether the first data block can be reduced is preserved in the hash. The method iteratively performs a hash computation of the hash for the first data block until convergence occurs, and calculates the value to represent an entropy of the converged hash.

In an example embodiment of the current technique, when the method uses the value to train the machine learning system to assess data reduction associated with the second data block, the method determines a number of times to iteratively perform the hash computation to obtain the converged hash. The method uses the number of times to train the machine learning system to determine a second number of times to iteratively perform a hash computation of a hash associated with the second data block to obtain the data reduction assessment for the second data block.

In an example embodiment of the current technique, the machine learning system is a neural network.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by Dell EMC™ of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an SATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by Dell EMC™, Hopkinton, Mass.). In such an arrangement, typically the file based storage hardware operates as a front-end to the block based storage system such that the file based storage hardware and the block based storage system form a unified storage system.

Figure 2:
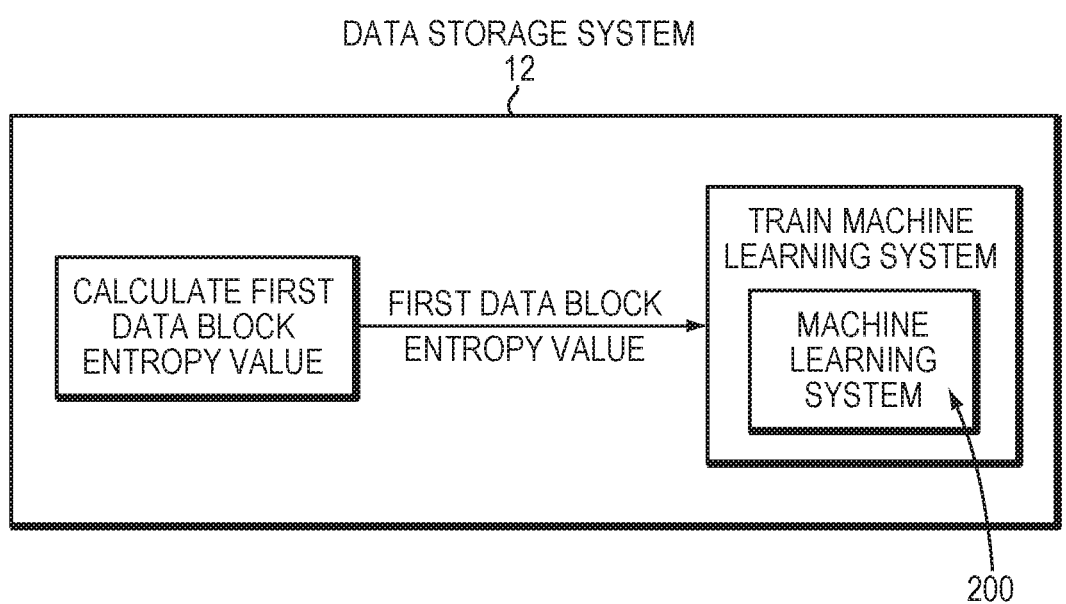
FIG. 2 is an example embodiment of a data storage system that manages data reduction, in accordance with an embodiment of the present disclosure.

FIG. 2 illustrates a data storage system 12 that manages data reduction, according to one embodiment of the current technique. The method calculates an entropy value (i.e., the first data block entropy value as illustrated in FIG. 2) for a first data block. In an example embodiment, the entropy value of the first data block represents a randomness of data within the first data block. In an example embodiment, the entropy value is calculated by computing the hash, or digest key of the first data block, and then repeatedly computing the hash of the hash until convergence occurs, for example, until the smallest value is determined. In an example embodiment, the hash calculated for the first data block is an entropy preserving hash, for example, such as the Shannon equation. It should be noted that any entropy preserving equation may be used. The first data block entropy value is used to train the machine learning system 200. The machine learning system 200 determines whether subsequent data blocks are compressible and/or dedupable without actually having to perform the data reduction on those subsequent data blocks. For example, the machine learning system 200 determines whether a subsequent data block is compressible without having to compress the data block. The machine learning system 200 determines whether a subsequent data block is dedupable without the data storage system 12 having to perform the deduplication process.

Figure 3:
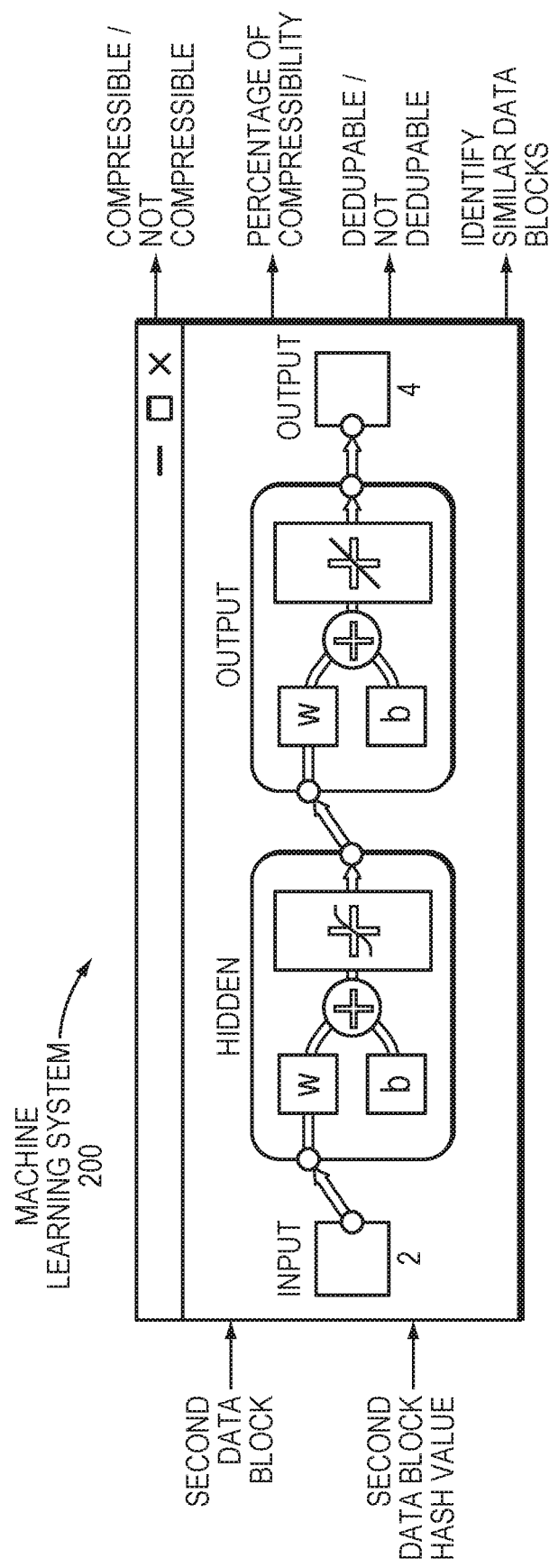
FIG. 3 illustrates a function fitting neural network that can be used to train a machine learning system, in accordance with an embodiment of the present disclosure.

FIG. 3 illustrates a function fitting neural network that can be used to train a machine learning system, according to one embodiment of the current technique. Function fitting is the process of training a neural network on a set of inputs to produce an associated set of target outputs. In an example embodiment, the network is constructed with the desired hidden layers and a training algorithm. The neural network is trained using inputs as disclosed herein. The neural network forms a generalization of the input-output relationship. The trained neural network may then be installed on a server to assess compressibility and/or dedupability. Once trained, the neural network generates outputs for inputs from the server. In other words, the neural network generates outputs using inputs on which the neural network was not trained.

In an example embodiment, the machine learning system 200 accepts as input a first data block and a hash value associated with a second data block. The machine learning system 200 determines whether the second data block is compressible. In an example embodiment, the machine learning system 200 may be trained with hash values of different sizes. In an example embodiment, a user, for example, has determined a compressibility threshold. Using the compressibility threshold, the machine learning system 200 determines whether the second data block is compressible to meet or exceed the compressibility threshold. In an example embodiment, the machine learning system 200 also determines the maximum amount of compressibility for the second data block.

In an example embodiment, the method calculates an entropy value for a first data block. As part of that calculation, the method iteratively calculates a hash of an entropy preserving hash of the first data block until that value converges to, for example, the smallest value. In an example embodiment, data blocks that are not compressible converge with fewer iterations than data blocks that are compressible. Thus, the machine learning system 200 learns how many iterations of hash calculations are required to determine whether a data block is compressible. In other words, if data blocks that are not compressible converge within three iterations of hash calculations, then the machine learning system 200 may be trained to accept, as input, the hash value associated with the second data block, calculate the entropy preserving hash of the second data block, and then iteratively perform the hash calculations two more times (for a total of three iterations) to determine whether the second data block is compressible. Likewise, if the first data block converges after N iterations, and the first data block is compressible and dedupable, then the machine learning system 200 may be trained to iteratively perform the hash calculations N times to determine whether the second data block is compressible and dedupable. Thus, the machine learning system 200 learns how many iterations are required for the hash calculation to converge without having to actually determine the number of iterations required to achieve convergence.

In another example embodiment, as the machine learning system 200 performs the data reduction assessment, the machine learning system 200 learns the behavior of the data. For example, data blocks produced from a particular application (or applications) have similar behavior. Thus, the machine learning system 200 learns the behavior of previous data blocks. When a data block from that application is entered into the machine learning system 200 as input, the machine learning system 200 provides, as output, whether the data block is compressible, the compressibility percentage, dedupability, and/or similar data blocks, without having to, for example, perform the iterations to reach convergence. In an example embodiment, the output of the machine learning system 200 determines whether the second data block is cached or not.

As noted above, the machine learning system 200 learns how many iterations of hash calculations are required to achieve convergence. In an example embodiment, with the knowledge of the number of iterations, and knowledge of the behavior of the data block (based on the behavior of previous data blocks, from, for example, a similar application), when the machine learning system 200 receives, as input, a data block, the machine learning system 200 immediately returns the output without having to perform the calculations. For example, if the machine learning system 200 has been trained that a first data block that converges after three iterations is not compressible, and the machine learning system 200 receives as input a second data block that has similar behavior as the first data block, the machine learning system 200 determines that the second data block will converge after three iterations (without actually having to perform the iteration calculations), and therefore, the second data block is not compressible. The machine learning system 200 then deletes the hash value from the cache. Thus, the trained machine learning system 200 reduces the computation required by the data storage system 12, and reduces the storage space used by the data blocks by deleting the hash value once it has been determined, by the machine learning system 200, that the data block is compressible and/or dedupable.

In an example embodiment, the machine learning system 200 determines whether the second data block is dedupable. For example, the machine learning system 200 determines whether the machine learning system 200 has processed other data blocks that are similar to the second data block. In other words, the machine learning system 200 identifies whether, in the history of the operation of the machine learning system 200, the machine learning system 200 has processed a data block that is similar to the second data block. In yet another example embodiment, the machine learning system 200 identifies those similar data blocks. Thus, the deduplication process does not have to use the data storage system 12 resources to search the data storage system 12 for the similar data blocks, thereby saving the storage system resources. Thus, the trained machine learning system 200 reduces the computation required by the data storage system 12.

In an example embodiment, the machine learning system 200 may assess whether data blocks are dedupable with data blocks of different size hash values, (i.e., digest keys). In an example embodiment, the machine learning system 200 may compare the hash values bit by bit to determine dedupability. In another example, embodiment, larger size hashes may be utilized to reduce the chance of collision (i.e., hash values that are the same even though the respective data blocks are different).

Figure 4:
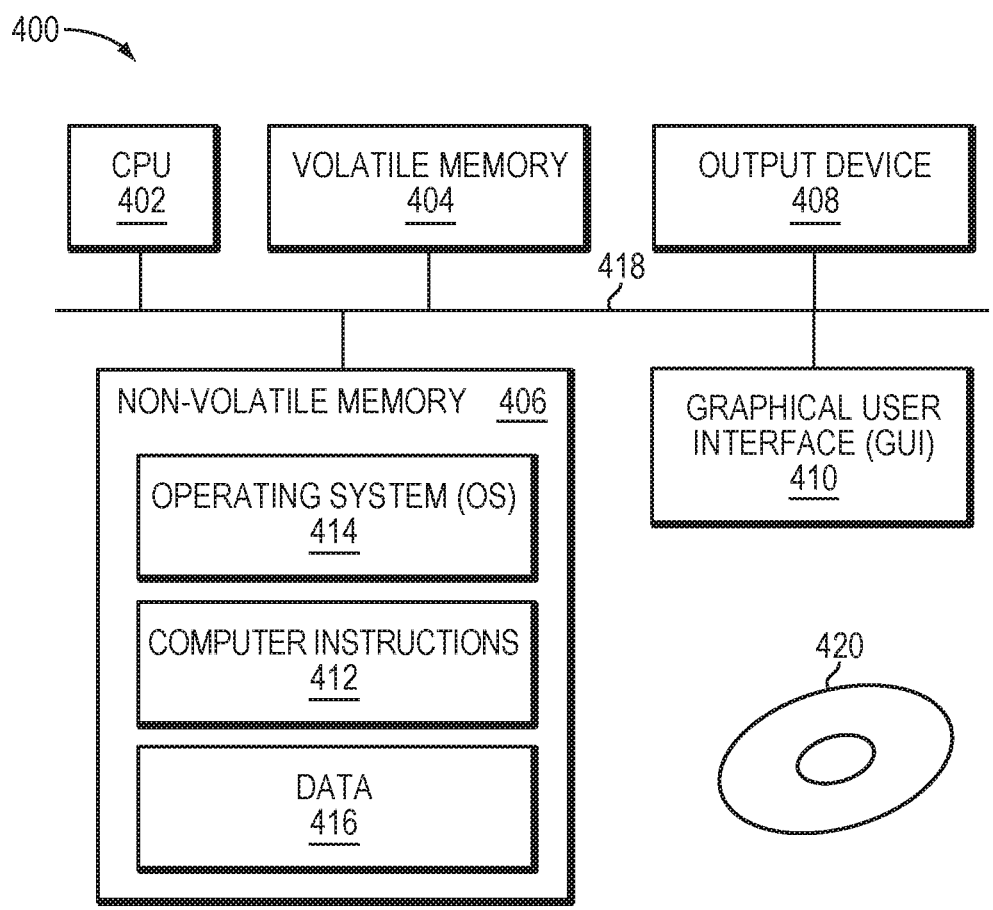
FIG. 4 is a block diagram of a computer, in accordance with an embodiment of the present disclosure.

FIG. 4 illustrates a block diagram of a computer 400 that can perform at least part of the processing described herein, according to one embodiment. The computer 400 may include a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 may be configured to store computer instructions 412, an operating system 414, and data 416. In one example, the computer instructions 412 are executed by the processor 402 out of volatile memory 404. In one embodiment, an article 420 comprises non-transitory computer-readable instructions. In some embodiments, the computer 400 corresponds to a virtual machine (VM). In other embodiments, the computer 400 corresponds to a physical computer.

Figure 5:
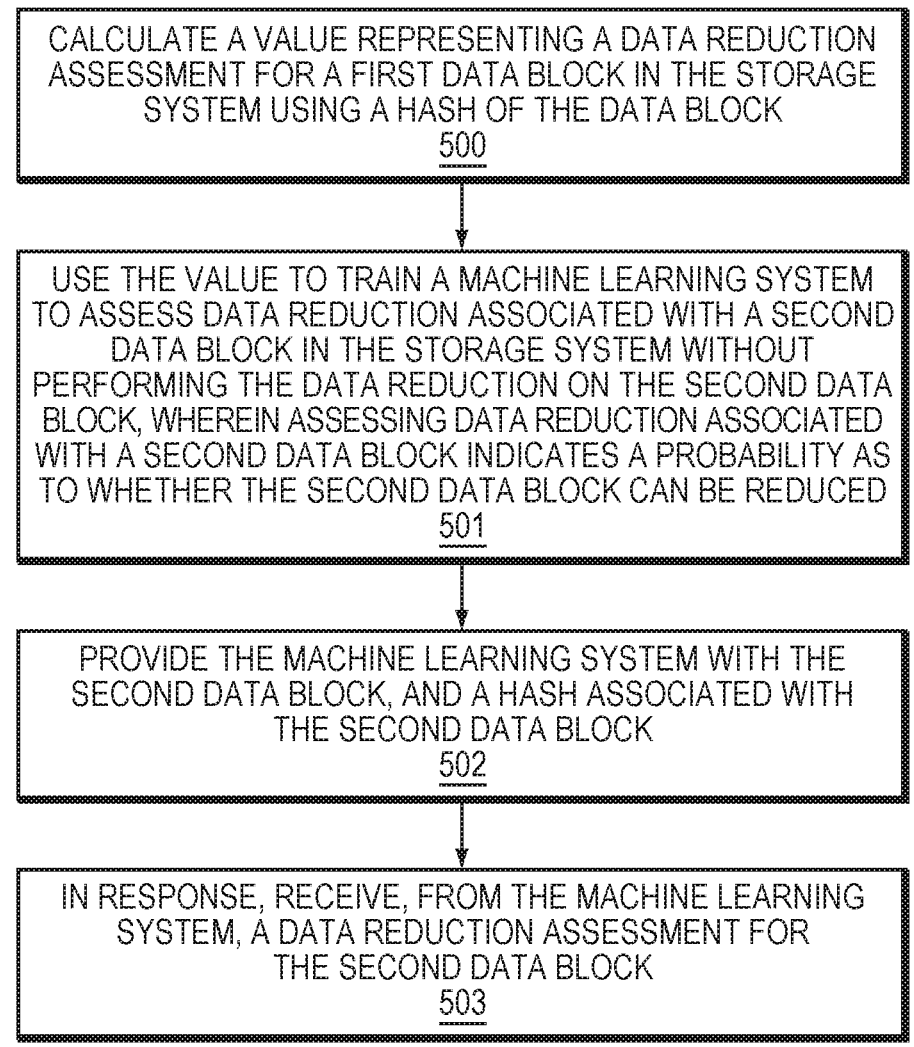
FIG. 5 is a flow diagram illustrating processes that may be used in connection with techniques disclosed herein.

Referring to FIG. 5, shown is a more detailed flow diagram illustrating managing data reduction in a data storage system 12 using machine learning systems. With reference also to FIGS. 1-4, the method calculates a value (i.e., an entropy value) representing a data reduction assessment for a first data block in the data storage system 12 using a hash of the data block (Step 500). In an example embodiment, the method calculates the hash for the first data block, where a probability as to whether the first data block can be reduced is preserved in the hash. In an example embodiment, the method calculates the entropy of the first data block as the value. In another example embodiment, the hash of the first data block is an entropy preserving hash. The calculated hash is required for determining dedupability.

In an example embodiment, the method iteratively performs a hash computation of the hash for the first data block until convergence. In other words, the method iteratively calculates a hash of an entropy preserving hash of the first data block until that value converges to, for example, the smallest value. In another example embodiment, the entropy value represents the entropy of the converged hash.

In an example embodiment, the method calculates the entropy of a hash of the first data block to save storage system resources, as opposed to calculating the entropy of the first data block. Calculating the entropy of the first data block uses fewer storage system resources than compressing the first data block, and may use fewer resources than compressing even a portion of the first data block. Likewise, calculating the entropy of the hash uses fewer storage system resources than calculating the entropy of the first data block.

In an example embodiment, the method uses the value to train a machine learning system to assess data reduction associated with a second data block in the data storage system 12 without performing the data reduction on the second data block. Assessing data reduction associated with a second data block indicates a probability as to whether the second data block can be reduced (Step 501). Data reduction may be compressibility and/or dedupability. The machine learning system 200 may be a non-linear model using neural network based machine learning. In an example embodiment, the neural network is a function fitting neural network as illustrated in FIG. 3.

In an example embodiment, the method avoids storing the second data block in the data storage system 12 based on the probability. In an example embodiment, the machine learning system 200 determines the compressibility and/or dedupability. As noted above, the machine learning system 200 determines whether the data block is compressible prior to actually performing the compression on the second data block, thus saving the effort of compressing the second data block, and then determining the compressed second data block does not meet the minimum compressibility threshold. The method also avoids storing the hash of the second data block because once the machine learning system 200 determines the compressibility and/or dedupability of the second data block, the method deletes the hash, releasing additional space within the storage system.

In an example embodiment, the method provides the machine learning system with the second data block, and a hash associated with the second data block (Step 502), and in response, receives, from the machine learning system, a data reduction assessment for the second data block (Step 503). As illustrated in FIG. 3, in an example embodiment, the machine learning system 200 accepts as input a first data block and a hash value associated with a second data block. In an example embodiment, the data reduction assessment for the second data block is a compressibility associated with the second data block. In other words, the machine learning system 200 determines whether the second data block is compressible, and may also determine the maximum amount of compressibility for the second data block.

In an example embodiment, the data reduction assessment for the second data block is a dedupability associated with the second data block. In other words, the machine learning system 200 determines whether the second data block is dedupable. In an example embodiment, the machine learning system identifies at least one other data block previously assessed by the machine learning system that is identical to the second data block. For example, the machine learning system 200 determines whether the machine learning system 200 has processed other data blocks that are similar to the second data block. In other words, the machine learning system 200 identifies whether, in the history of the operation of the machine learning system 200, the machine learning system 200 has processed a data block that is similar to the second data block. In yet another example embodiment, the machine learning system 200 identifies those similar data blocks, and outputs the identification of those similar blocks as an output of the machine learning system 200.

In an example embodiment, the method trains the machine learning system to assess data reduction associated with the second data block in the data storage system 12 based on a respective behavior associated with a plurality of data blocks in the data storage system 12, where the plurality of data blocks comprises the first data block. In another example embodiment, as the machine learning system 200 performs the data reduction assessment, the machine learning system 200 learns the behavior of the data. For example, data blocks produced from a particular application (or applications) have similar behavior. Thus, the machine learning system 200 learns the behavior of previous data blocks. As noted above, when a data block from that application is entered into the machine learning system 200 as input, the machine learning system 200 provides, as output, whether the data block is compressible, the compressibility percentage, dedupability, and/or similar data blocks, without having to, for example, perform the iterations to reach convergence.

In an example embodiment, when the method uses the entropy value to train the machine learning system to assess data reduction associated with the second data block, the method determines a number of times to iteratively perform the hash computation to obtain the converged hash, and uses the number of times to train the machine learning system to determine a second number of times to iteratively perform a hash computation of a hash associated with the second data block to obtain the data reduction assessment for the second data block. As noted above, the machine learning system 200 learns how many iterations of hash calculations are required to achieve convergence. In an example embodiment, with the knowledge of the number of iterations, and knowledge of the behavior of the data block (based on the behavior of previous data blocks, from, for example, a similar application), when the machine learning system 200 receives, as input, a data block, the machine learning system 200 immediately returns the output without having to perform the calculations. For example, if the machine learning system 200 has been trained that a first data block that converges after three iterations is not compressible, and the machine learning system 200 receives as input a second data block that has similar behavior as the first data block, the machine learning system 200 determines that the second data block will converge after three iterations (without actually having to perform the iteration calculations), and therefore, the second data block is not compressible. The machine learning system 200 then deletes the hash value from the cache. Thus, the trained machine learning system 200 reduces the computation required by the data storage system 12 (for example, compressing the second data block only to determine the second data block is not compressible), and reduces the storage space used by the data blocks by deleting the hash value once it has been determined, by the machine learning system 200, that the data block is compressible and/or dedupable.

There are several advantages to embodiments disclosed herein. For example, the method provides a quick determination regarding compressibility and/or dedupability. The method avoids needlessly using the CPU resources to compress data blocks that are ultimately determined to not meet the compressibility threshold. The method uses fewer storage system resources by not using the storage system resources to locate duplicate data blocks. The method uses less cache space by storing entropy values instead of hashes. The method deletes hashes once the machine learning system has made a compressibility and/or dedupability determination.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGs illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of managing data reduction in storage systems using machine learning systems, the method comprising:
    calculating a value representing a data reduction assessment for a first data block in a storage system using a hash of the data block;
    using the value to train a machine learning system to assess data reduction associated with a second data block in the storage system without performing the data reduction on the second data block by:
        determining a number of times to iteratively perform the hash computation to obtain the converged hash;
        using the number of times to train the machine learning system to determine a second number of times to iteratively perform a hash computation of a hash associated with the second data block to obtain the data reduction assessment for the second data block; and
    wherein assessing data reduction associated with the second data block indicates a probability as to whether the second data block can be reduced.

2. The method of claim 1, further comprising:
    avoiding storing the second data block in the storage system based on the probability.

3. The method of claim 1, further comprising:
    training the machine learning system to assess data reduction associated with the second data block in the storage system based on a respective behavior associated with a plurality of data blocks in the storage system, wherein the plurality of data blocks comprises the first data block.

4. The method of claim 1, further comprising:
    providing the machine learning system with the second data block, and a hash associated with the second data block; and
    in response, receiving, from the machine learning system, a data reduction assessment for the second data block.

5. The method of claim 4, wherein the data reduction assessment for the second data block is a compressibility associated with the second data block.

6. The method of claim 4, wherein the data reduction assessment for the second data block is a dedupability associated with the second data block.

7. The method of claim 6, wherein the machine learning system identifies at least one other data block previously assessed by the machine learning system that is identical to the second data block.

8. The method of claim 1, wherein calculating the value representing the data reduction assessment for the first data block comprises:
    calculating the hash for the first data block, wherein a probability as to whether the first data block can be reduced is preserved in the hash;
    iteratively performing a hash computation of the hash for the first data block until convergence; and
    calculating the value to represent an entropy of the converged hash.

9. The method of claim 1, wherein the machine learning system is a neural network.

10. A system of managing data reduction in storage systems using machine learning systems, the system comprising a processor configured to:
    calculate a value representing a data reduction assessment for a first data block in a storage system using a hash of the data block;
    use the value to train a machine learning system to assess data reduction associated with a second data block in the storage system without performing the data reduction on the second data block by:
        determining a number of times to iteratively perform the hash computation to obtain the converged hash;
        using the number of times to train the machine learning system to determine a second number of times to iteratively perform a hash computation of a hash associated with the second data block to obtain the data reduction assessment for the second data block; and
    wherein assessing data reduction associated with the second data block indicates a probability as to whether the second data block can be reduced.

11. The system of claim 10, further configured to:
    avoid storing the second data block in the storage system based on the probability.

12. The system of claim 10, further configured to:
    train the machine learning system to assess data reduction associated with the second data block in the storage system based on a respective behavior associated with a plurality of data blocks in the storage system, wherein the plurality of data blocks comprises the first data block.

13. The system of claim 10, further configured to:
    provide the machine learning system with the second data block, and a hash associated with the second data block; and
    in response, receive, from the machine learning system, a data reduction assessment for the second data block.

14. The system of claim 13, wherein the data reduction assessment for the second data block is a compressibility associated with the second data block.

15. The method of claim 13, wherein the data reduction assessment for the second data block is a dedupability associated with the second data block.

16. The system of claim 15, wherein the machine learning system identifies at least one other data block previously assessed by the machine learning system that is identical to the second data block.

17. The system of claim 10, wherein the processor configured to calculate the value representing the data reduction assessment for the first data block is further configured to:
    calculate the hash for the first data block, wherein a probability as to whether the first data block can be reduced is preserved in the hash;
    iteratively perform a hash computation of the hash for the first data block until convergence; and
    calculate the value to represent an entropy of the converged hash.

18. A computer program product for managing data reduction in storage systems using machine learning systems, the computer program product comprising: a non-transitory computer readable storage medium having computer executable program code embodied therewith, the program code executable by a computer processor to:
    calculate a value representing a data reduction assessment for a first data block in a storage system using a hash of the data block;
    use the value to train a machine learning system to assess data reduction associated with a second data block in the storage system without performing the data reduction on the second data block by:

determining a number of times to iteratively perform the hash computation to obtain the converged hash;

using the number of times to train the machine learning system to determine a second number of times to iteratively perform a hash computation of a hash associated with the second data block to obtain the data reduction assessment for the second data block; and wherein assessing data reduction associated with the second data block indicates a probability as to whether the second data block can be reduced.

* * * * *